United States Patent [19]
Reese et al.

[11] Patent Number: 5,323,691
[45] Date of Patent: Jun. 28, 1994

[54] FROZEN DRINK MIXER

[76] Inventors: Joseph J. Reese, 10117 Hobson's Choice, Ellicott City, Md. 21042; John F. Hasson, 608A Knollcrest Pl., Cockeysville, Md. 21030

[21] Appl. No.: 959,100

[22] Filed: Oct. 9, 1992

[51] Int. Cl.⁵ .................................................. A23L 2/00
[52] U.S. Cl. .................................. 99/275; 99/300; 99/484
[58] Field of Search .............. 99/275, 323.3, 286, 99/300, 316, 486; 366/154, 155; 241/DIG. 17, 106.2; 222/135, 146.6

[56] References Cited

U.S. PATENT DOCUMENTS

| | | | |
|---|---|---|---|
| 1,681,929 | 8/1928 | De Armond et al. | 99/275 |
| 2,462,019 | 2/1949 | Bowman | 99/275 |
| 2,552,933 | 5/1951 | Browne | 241/DIG. 17 |
| 2,707,911 | 5/1955 | Charpiat | 99/275 |
| 2,712,887 | 7/1955 | King | 99/275 |
| 3,106,895 | 10/1963 | Hood | 99/275 |
| 3,156,103 | 11/1964 | Ross . | |
| 3,987,715 | 10/1976 | Muller | 99/275 |
| 4,649,809 | 3/1987 | Kanezashi | 99/323.3 |
| 4,653,281 | 3/1987 | Van Der Veer . | |
| 4,681,030 | 7/1987 | Herbert . | |
| 4,867,052 | 9/1989 | Cipelletti | 366/155 |
| 4,919,075 | 4/1990 | Himi | 241/101.2 |
| 4,993,593 | 2/1991 | Fabiano et al. . | |
| 5,109,759 | 5/1992 | Asahara | 99/486 |

*Primary Examiner*—Stephen F. Gerrity
*Assistant Examiner*—James F. Hook
*Attorney, Agent, or Firm*—Richard C. Litman

[57] ABSTRACT

An apparatus for preparing blended beverages, particular frozen drinks, in which an ice dispenser, liquid mix dispenser and blender unit are combined in a single unit. A programmable timing mechanism regulates the period of time the ice dispenser, liquid mix dispenser and the blender unit operate, so that an operator needs to only push momentary push buttons to effect operation of the apparatus. The apparatus will automatically deliver an appropriate amount of ice and liquid to the blender unit and will turn on the blender at the appropriate time and for the appropriate amount of time to prepare a frozen drink of desired size.

6 Claims, 4 Drawing Sheets

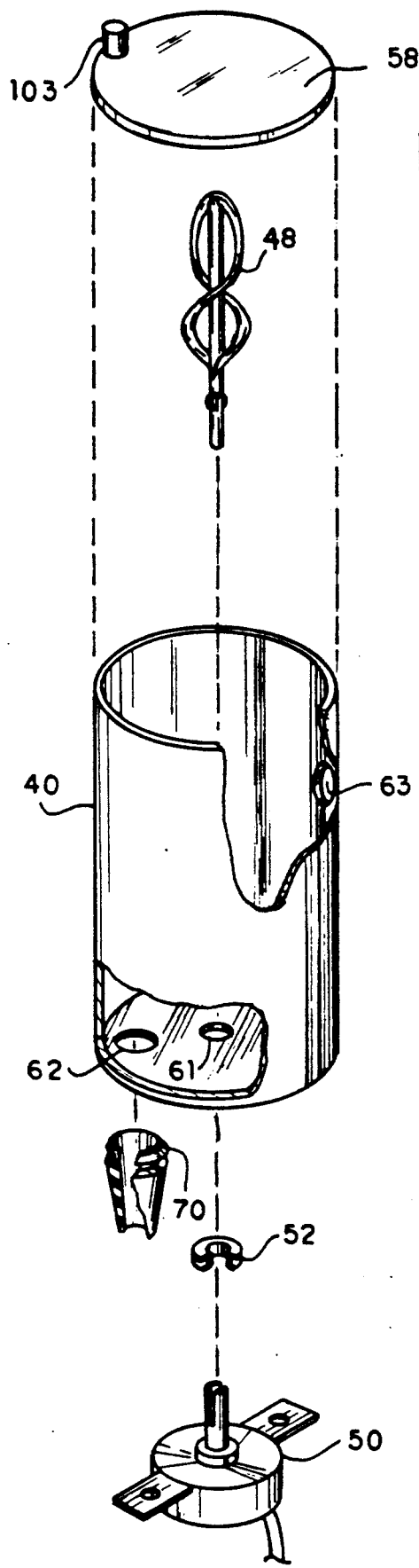
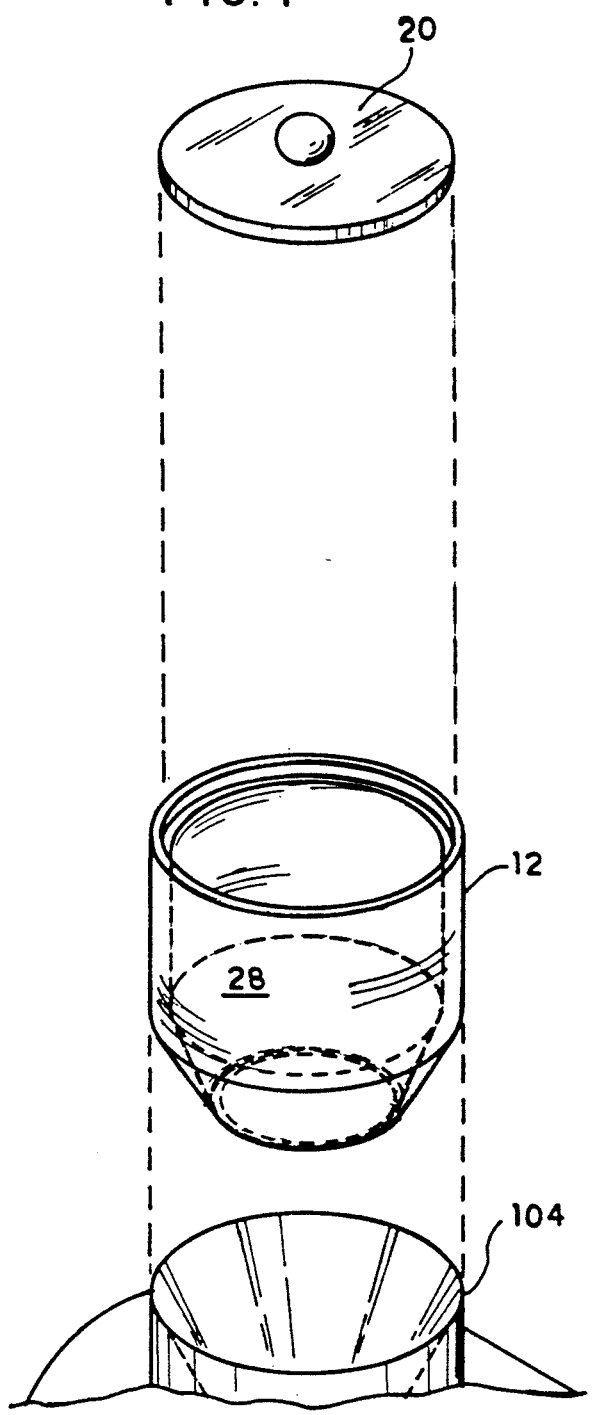

FROZEN DRINK MIXER

FIELD OF THE INVENTION

The present invention relates to an apparatus for preparing blended beverages and, in particular, to an apparatus for making frozen drinks wherein shaved ice and flavorings are dispensed to a blender unit.

BACKGROUND OF THE INVENTION

The demand for "frozen drinks" has soared. These drinks, delicious concoctions having exotic names conjuring images of tropical islands, have become the refreshment of choice for a large portion of the adult population. Preparing these drinks, however, has never been an easy task. Typically, several ingredients including liquor must be added in a time consuming process to a finely-divided ice/water mixture having a thickness and almost creamy texture prior to serving. In the busy atmosphere of a bar, club, or restaurant setting, where profit is dictated largely by controlling portion size, waste connected with the preparation of such drinks has never been easy to control.

Typically, a frozen drink is prepared by placing the drink ingredients, including ice, into a conventional blender. The blender is then operated to reduce the ice to a pulverized state, and the resulting mixture then transferred to a glass for consumption by a patron. Because of the large span of time required in measuring and mixing the ingredients, several portions of a given drink are usually prepared in a blender simultaneously. If these drinks remain unsold at the time when the ice within the mixture has melted into a liquid then the drinks must be discarded.

Aside from the loss of product associated with conventional blending methods, an additional problem is frequently encountered with mixed drinks; the amount of time consumed while the blender grinds the ice limits the number of customers that a bartender can serve. Most bartenders cannot receive customer orders when their attention is focused upon a noisy blender. The reduced sales caused by conventional blending techniques can have a significant long-term economic impact upon the proprietor of an establishment serving mixed drinks.

In the past, machines for preparing frozen drinks have been developed. For instance, U.S. Pat. No. 4,681,030, issued Jul. 21, 1987 to John M. Herbert discloses an apparatus in which an ice-shaving machine is combined with a blender in a single unit. The ice shaver and blender are electrically wired together, and programmable timing means are provided. However, the apparatus provides no means for dispensing liquid mixes which must be manually added with any liquor to the blender. Additionally, U.S. Pat. No. 4,653,281, issued Mar. 31, 1987 to Richard F. Van Der Veer discloses a drink making method and apparatus for making beverages having dispensed ice-slush and a blend of additional flavorings. The system includes a blender for mixing the constituents, and the device dispenses ice into the blender while liquor and fruit flavorings are manually placed therein. Also, U.S. Pat. No. 3,156,103, issued Nov. 10, 1964 to Anthony J. Ross teaches an apparatus for dispensing a beverage into a cup and a measured charge of ice into the cup for cooling the same. The apparatus includes an ice producing and storing device, and a plurality of dispensers for more than one type of drink, with the dispensers electrically operative to dispense a premeasured charge of liquid.

Further, U.S. Pat. No. 4,993,593, issued Feb. 19, 1991 to Ralph Fabiano and Fortunato Colacino discloses a device for mixing and then dispensing hot liquids in a premeasured amount.

None of the above inventions and patents, taken either singly or in combination, is seen to describe the instant invention as claimed.

SUMMARY OF THE INVENTION

Accordingly, it is a principal object of the invention to provide an apparatus which can make frozen drinks quickly and efficiently.

It is a further object of the invention to provide an apparatus which will significantly save time in the preparation of frozen drinks by reducing the number of steps required and minimizing the physical movements required.

Still another object of the invention is to provide an apparatus for monitoring drinks served in a given period of time.

It is a further object of the invention to provide an apparatus for preparing frozen drinks which minimizes waste and eliminates surplus drinks typically discarded.

An additional object of the invention is to provide a frozen drink apparatus which maintains consistency of drink thickness.

A still further object of the invention is to provide a frozen drink apparatus which maintains consistency of drink flavor.

Yet another object of the invention is to provide a frozen drink apparatus which maintains consistency of portion control.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 3 is an exploded perspective view of a beverage receptacle used in the frozen drink apparatus.

FIG. 4 is an exploded perspective view of an ice bucket used in the frozen drink apparatus.

Similar reference characters denote corresponding features consistently throughout the attached drawings.

DETAILED DESCRIPTION OF THE PREFERRED EMBODIMENT

Figure 1:
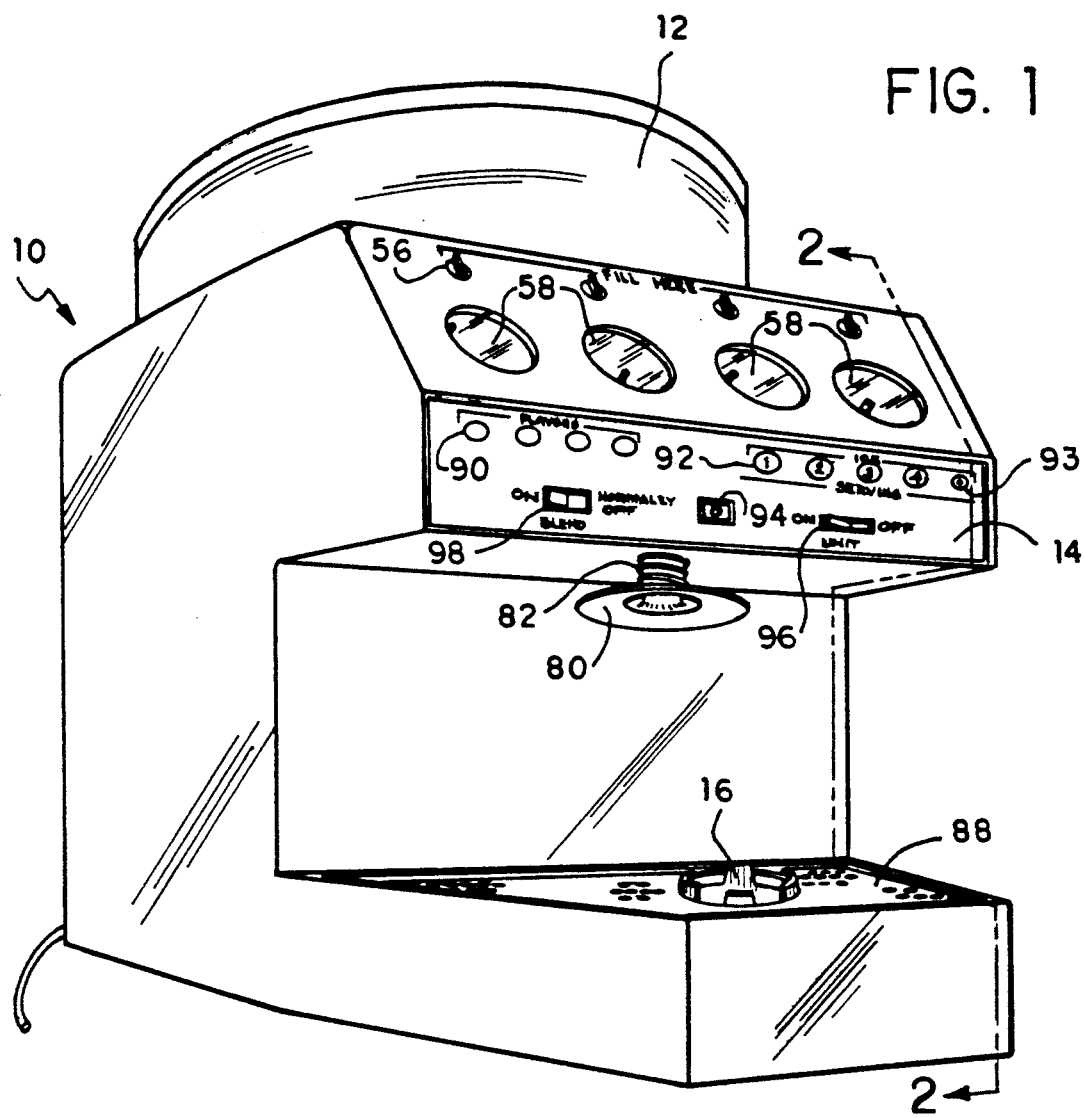
FIG. 1 is a perspective view of the frozen drink apparatus in accordance with the present invention.

FIG. 1 shows an overall perspective view of the preferred embodiment of the frozen drink apparatus 10 of the present invention. Apparatus 10 has a vertically-mounted housing assembly including an ice bucket 12 for holding ice cubes, a control panel 14 for selecting a drink, and a blender unit 16 for preparing the frozen drink. A timing mechanism regulates the period of time an ice dispenser, liquid dispenser and the blender unit operate, so that, by the momentary activation of control buttons, the apparatus may be activated and will automatically deliver an appropriate amount of ice and liquid to the blender unit and will turn on the blender at the appropriate time and for the appropriate amount of time to prepare a frozen drink.

Figure 2:
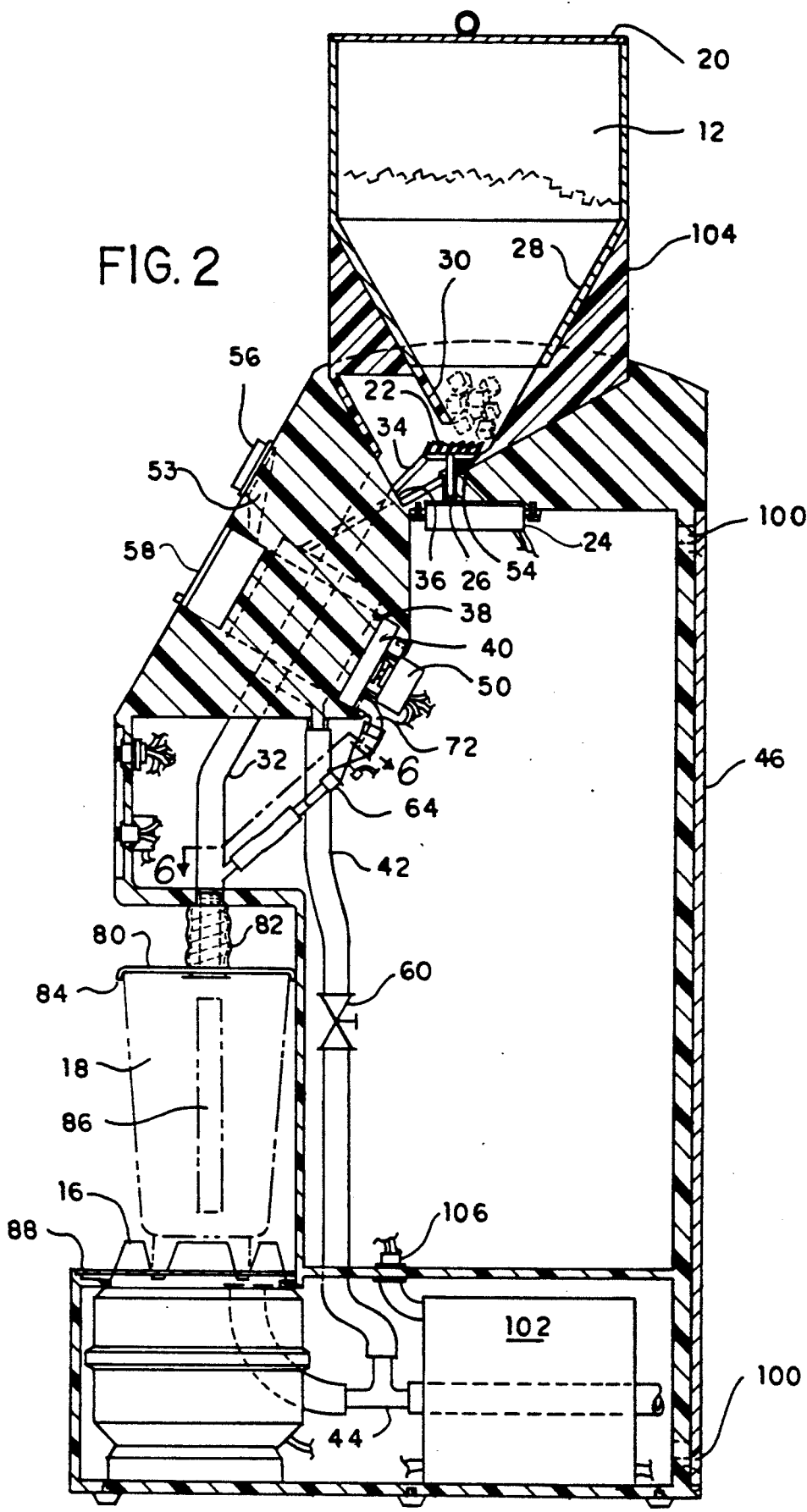
FIG. 2 is a side section view of the frozen drink apparatus drawn along lines 2—2 of FIG. 1.

Apparatus 10 has an ice shaver machine for preparing and delivering shaved ice to blender cup 18. As seen in FIG. 2, ice bucket or container 12, with lid 20, holds a supply of ice cubes to be shaved. Ice bucket 12 is preferably transparent to enable monitoring the supply of ice cubes, and circular, with no corners for the cubes to become entrapped. However, other shapes can be utilized for different benefits. For instance, rectangular or square ice buckets can easily accommodate longer and larger ice cube trays for less spillage when filling the ice bucket.

At the lower most portion of ice bucket 12 are rotary blades 22 for shaving the ice cubes into smaller pieces of finely-divided, shaved ice. Motor 24 spins shaft 26 and rotary blades 22 to crush ice cubes falling from ice bucket 12. The lower half of ice bucket 12 has a funnel shaped wall 28 to guide the ice cubes to rotary blades 22. Circular extension piece 30 directs the ice cubes to rotary blades 22 and ensures the ice cubes contact the rotary blades 22. Rotary blades 22 spinning counter-clockwise dig into the supply of ice cubes and crush the cubes into pieces of thinly-shaved ice. The shaved ice is then directed, via centrifugal force from blades 22, to passage tube 32 by the spinning rotary blades 22 and guide piece 34. Once in passage tube 32, the shaved ice will continue to slide down within passage tube 32 and fall into blender cup 18. Passage tube 32 is of sufficient diameter for shaved ice coming from rotary blades 22 to fall freely therethrough. Additionally, tube 32 may be coated with a polytetrafluoroethylene material, e.g., TEFLON®.

Alternatively, rotary blades 22 may be positioned within funnel shaped wall 28. For such an embodiment, circular extension piece 30 is removed and rotary blades 22 are raised using an extension shaft (not shown). This allows a larger rotary blade wheel to be used for a faster flow rate of crushed ice. In this embodiment, a larger guide piece is also used to direct shaved ice to passage tube 32. Different sized rotary blades 22 may be used to adjust the thickness of the shaved ice or to deliver ice/-slush rather than shaved ice. In the preferred embodiment, rotary blades 22 are designed to deliver shaved ice which provides a somewhat smoother and more appealing texture to the frozen drinks.

Ice water coming from ice bucket 12 is drained through passage 36. Passage 36 leads to circular housing 38 which partially encases receptacles 40. Housing 38 drains ice water to a conduit 42 and subsequently to drainage conduit 44. Conduit 44 drains water through a drainage port (not shown) which can be suitably located in back plate 46. To prevent leakage of ice water around shaft 26, tight fitting washer 54 encircles shaft 26 as shown in FIG. 2. Washer 54 may be made from conventional washer material, such as rubber or plastic.

Receptacles 40 contain liquid mixes pertaining to a specific type of drink. As shown in FIG. 3 a stirrer 48 is inside receptacle 40 to maintain homogenization of the mixes. Each receptacle 40 has a stirrer 48 and an attached motor 50 to rotate the stirrer. Rubber washer 52 prevents leakage from orifice 61, where motor 50 inserts into receptacle 40. To fill receptacle 40, fill port 54 is provided. In the preferred embodiment, apparatus 10 includes four receptacles, each having its own fill port 54. By removing cap 56, a drink mix can easily be poured into receptacle 40. Each receptacle 40 has a transparent cap 58 (see FIG. 1) to permit monitoring the level of mix therein.

Liquid mixes in receptacles 40 are chilled from ice water draining from ice bucket 12. Housing 38 encircles each receptacle as shown in FIG. 2. By plugging drainage conduit 44 at the drainage port, or closing valve 60 in conduit 42, housing 38 will fill with ice water coming from ice bucket 12.

Figure 6:
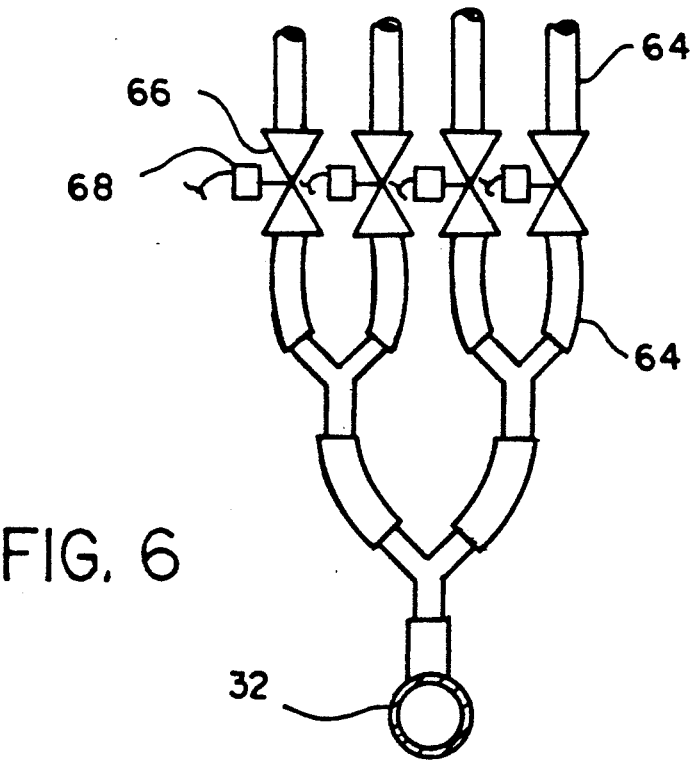
FIG. 6 is a detail sectional view of the dispensing conduits drawn along lines 6—6 of FIG. 2.

Each liquid mix is dispensed through an exit port 62 in receptacle 40 as shown in FIG. 3 to a dispensing conduit 64. By using an elbow joint 72 and rubber plug 70, dispensing conduit 64 can be connected to receptacle 40 without leakage. Dispensing conduit 64 has a valve 66 and solenoid mechanism 68 to control dispensing of liquid from receptacle 40. Dispensing conduit 64 dispenses the liquid mix to passage tube 32, which subsequently drains into blender cup 18. Each receptacle 40 has a dispensing conduit 64, with each dispensing conduit feeding to passage tube 32 as shown in FIG. 6.

Figure 5:
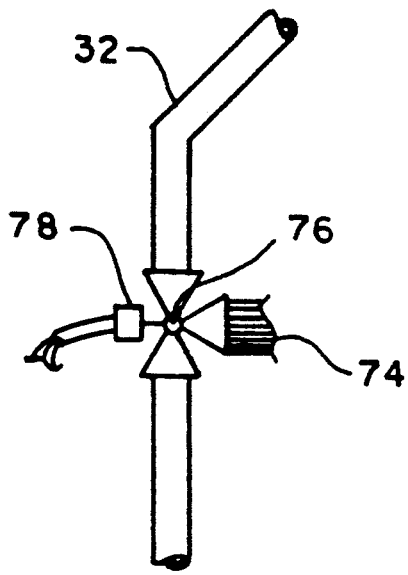
FIG. 5 is a section view of the dispensing conduits used in a second embodiment.

In a second embodiment, dispensing conduits 64 are replaced with tubes 74, leading to a single valve 76 and solenoid mechanism 78 in passage tube 32, as shown in FIG. 5. In the second embodiment, tubes 74 are connected directly with elbow joints 72, and valve 76 has an open passageway for ice falling through passage tube 32.

Turning to FIG. 2, below passage tube 32 is the blender cup 18 with handle 86. Cup 18 is a conventional glass or plastic blender cup that holds the drink mixture to be blended. Blender cup 18 has lid 80 fastened to passage tube 32 by flexible, resilient tubing 82. Tube 32 passes through tubing 82 forming a spout for delivering shaved ice and liquid mixes directly to blender cup 18 positioned therebeneath. Lid 80 remains suspended from tube 32 by flexible tubing 82 when blender cup 18 is removed. When mounting blender cup 18 on top of blender unit 16, lid 80 is forced upward to place blender cup 18 under lid 80. The resiliency of tubing 82 ensures lid 80, with lip 84, remains on blender cup 18 during operation of apparatus 10.

Below blender cup 18 is porous deck plate 88 for any liquid spills that do occur. A drip tray, not shown, below deck plate 88, collects dripping fluid or drains into drainage conduit 44. Blender unit 16 is housed within apparatus 10 below deck plate 88 and the drip tray to protect it from spillage and other moisture. The lower rear portion of apparatus 10 serves as a housing for timing mechanism 102.

Control panel 14 permits a user to select a drink and a desired quantity. Momentary push buttons 90 correspond to the liquid mixes within receptacles 40, and momentary push button 92 correspond to the number of drinks desired. Typically a specific drink will be made in quantities of 1-4. Push button 93 runs motor 24 only while depressed to offer additional ice as needed. Switch 96 turns apparatus on and off, and push button switch 98 runs blender unit 16 when depressed.

Counter 94 monitors the number of drinks made for a given period. Counter 94 will display the total number of drinks made in the given period. Alternatively, counter 94 will alternate displaying the number of drinks made for a specific drink flavoring.

Screws 100 permit removal of the back plate 46 of apparatus 10, to allow access to its working parts.

Motor 24 is fastened using conventional fastening means such as screws. By removing motor 24, rotary blades 22 may be removed for cleaning and/or replacing. Similarly, motor 50 is removably fastened to apparatus 10 for cleaning as needed. By removing transparent cap 58 using handle 103, access is gained to stirrer 48 which may be disconnected from motor 50. Then, by disconnecting elbow 72, receptacle 40 may be removed for cleaning or replacement. To reassemble, entrance port 63 and exit port 62 need to be aligned with fill port 54 and elbow 72, respectfully. When four receptacles 40 are used, as in the preferred embodiment, passage tube 32 is aligned between the middle two receptacles. Valve 60 can be reached when back plate 46 is removed.

Electrical wiring from motors 24 and 50, blender unit 16, control panel 14 and the solenoid valves lead to timing mechanism 102 which turns them on and then turns them off. Timing mechanism 102 is a programmable timing unit which controls the commencement and amount of liquid mix and shaved ice dispensed to blender cup 18. For controlling the dispensation of ice, timing mechanism 102 could be of the type taught in U.S. Pat. No. 4,681,030 issued Jul. 21, 1987 to John H. Herbert, for example, incorporated herein by reference. Reference is made to the Herbert reference for a detailed explanation of programmable camming mechanisms operate to control the motors, valves and blender unit.

Circuits in timing mechanism 102 control solenoids 68 and 78 to control the length of time valves 66 and 76 are open to dispense liquid mix from receptacles 40. The length of time valves 66 and 76 are open will be decided by the timing means based upon the number of drinks selected. Timing mechanism 102 is programmed with specific time intervals corresponding to the kind of drink and quantity desired.

Circuits in timing mechanism 102 will control the length of time motor 24 runs to deliver a set amount of ice. Programmed time intervals ensure the proper amount of ice is delivered. The commencement and duration of operation of blending unit 16 is further controlled by timing mechanism 102. The sequence of liquid mix and ice delivery and the blender operation can be preprogrammed so that an operator needs to only push the momentary push buttons 90 and 92 to effect operation of the apparatus and to prepare a frozen drink of desired size.

For maintaining homogenization of the liquid mixes in receptacles 40, timing mechanism 102 will turn on motors 50 and turn them off at set intervals. Timing unit 102 further includes a programmable memory chip for counter 94.

Operation of the apparatus proceeds as follows. After frozen drink apparatus 10 has been turned on using switch 96, the desired alcoholic drink ingredients are placed in blender cup 18. On control panel 14, the desired drink flavoring is selected using momentary push buttons 90, and the desired quantity of drinks is selected using momentary push buttons 92. The selected buttons will be registered by timing mechanism 102, which will actuate the valve and solenoid mechanism which corresponds to the selected drink to dispense enough liquid mix from one of the beverage receptacles 40 to blender cup 18 via passage tube 32. Next, the ice shaving mechanism commences operation, the length of time it operates being determined by the number of drinks selected. Any residual liquid mix will be washed from tube 32 by the shaved ice. Then, blender unit 16 will commence blending, the length of time it operates being determined by the number and kind of drink selected.

For additional blending, push button switch 98 is used. For additional ice, push button switch 93 is used.

In the preferred embodiment, apparatus 10 is molded as a single piece having an upper portion 104 for supporting an ice bucket as shown in FIGS. 1 and 4. Ice bucket 12 can be lifted off from upper portion 104 for cleaning and to access the upper, inside portion of apparatus 10. Apparatus 10 and ice bucket 12 can be fabricated from conventional materials, such as plastic, rubber, glass or metal. Preferably, bucket 12 and lids 20 and 80 are made of PLEXIGLASS ® to prevent chipping. The hose and conduits are suitably made of rubber or plastic.

It is to be understood that the present invention is not limited to the sole embodiment described above, but encompasses any and all embodiments within the scope of the following claims.

We claim:

1. An apparatus for preparing frozen blended beverages, comprising:
   a vertically-mounted housing assembly:
     an ice preparation machine mounted in said housing assembly and including:
       a cylindrical-shaped transparent container for holding ice cubes and ice water having an upper portion and a lower portion;
     said upper container portion having a lid member;
     said lower container portion having a funnel-shaped wall and an open bottom;
     a plurality of blades mounted within said lower container portion;
     a motor unit associated with said blades for rotating said blades;
     said funnel-shaped wall directing the ice cubes to contact said rotary blades whereby;
     the ice cubes are crushed into smaller pieces of finely-divided shaved ice; and
     said funnel-shaped wall and the rotation of said rotary blades force the shaved ice into a centrifugal movement within said lower container portion;
   a single primary conduit member connected to said open bottom of said lower container portion; said single primary conduit member receiving the free falling centrifugally-driven shaved ice through said open bottom of said lower container portion for passage therethrough;
   a secondary conduit member having an upper portion and an bottom portion; said upper portion connected to said open bottom of said lower container portion and receiving the ice water draining therefrom;
   a plurality of beverage mix receptacles supported within said housing assembly and partially encased by said secondary ice water conduit member for chilling said receptacles;
   conduit means connected to said bottom portion of said secondary conduit member for removing surplus chilling ice water from said housing assembly;
   each of said beverage mix receptacles containing a specific type of liquid mix;
   each of said beverage mix receptacles having a transparent cap for observation and maintenance of the supply of the beverage mix therein;

each of said beverage mix receptacles having a stirrer mounted therein for operatively maintaining homogenization of the liquid mix therein;

motor means associated with each of said stirrers for operatively rotating the said respective stirrer; said bottom portion of said secondary conduit member connected to said primary conduit member;

a blender unit supported within said housing assembly and positioned below said primary conduit member for operatively receiving the shaved ice and specific liquid mix therein;

valve means operatively positioned intermediate said beverage mix receptacles and said blender unit for controlling dispensation of the respective liquid mix from said beverage mix receptacles; and a timing control unit supported within said housing assembly and operatively associated with said ice preparation machine for automatically delivering an appropriate amount of shaved ice and liquid mix to said blender unit and, further for automatically operating said blender unit at the appropriate time and for the appropriate period of time for preparing a specific frozen blended beverage.

2. An apparatus according to claim 1 and including a conical-shaped extension sheet mounted in said lower container portion for guiding the ice cubes to said rotary blades.

3. Apparatus according to claim 1, wherein said primary conduit member is coated with a polytetrafluoroethylene material for aiding the passage of the shaved ice therethrough.

4. The apparatus according to claim 1, wherein each of said beverage mix receptacles has a tube for dispensing liquid to said primary conduit member, with each tube feeding to said valve means.

5. The apparatus according to claim 1, wherein said valve means includes an individual valve and solenoid mechanism in each said tube.

6. The apparatus according to claim 1, including four beverage mix receptacles, wherein each receptacle contains and dispenses a liquid to said primary conduit member.

* * * * *